Figure 1:
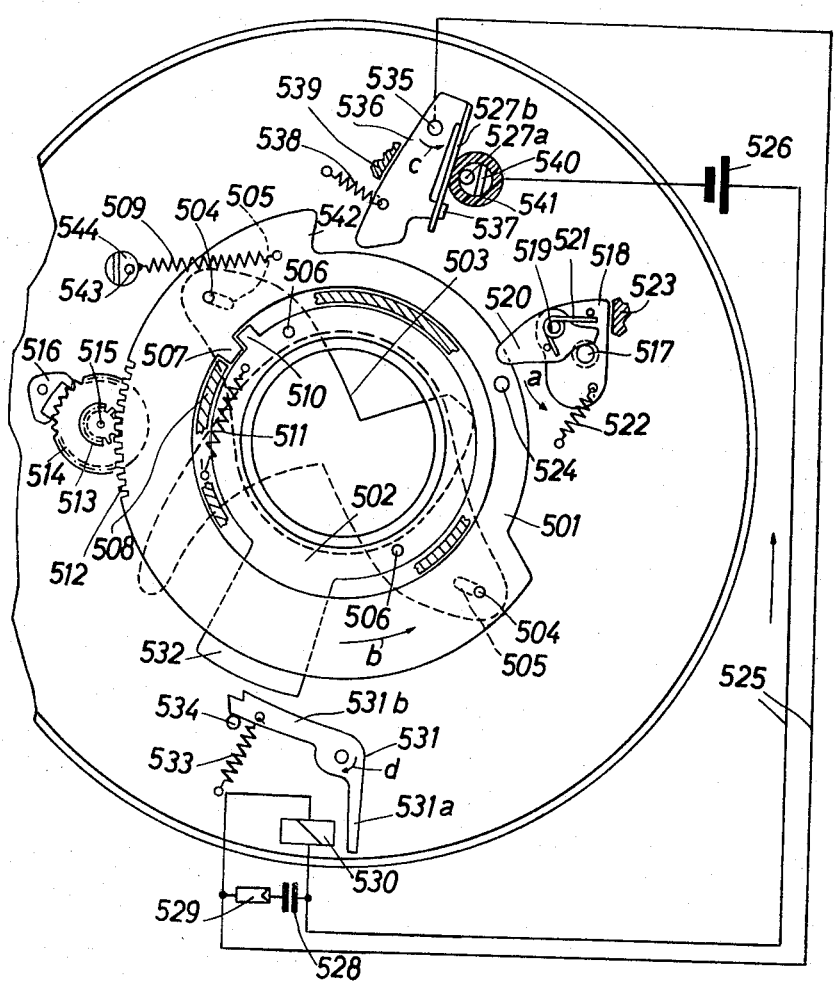

Aug. 15, 1967  G. KIPER  3,335,649
CAMERA SHUTTERS WHICH ALSO ACT AS DIAPHRAGMS
Filed Jan. 29, 1965  3 Sheets-Sheet 1

INVENTOR.
GERD KIPER
Michael J. Striker
Atty

Aug. 15, 1967   G. KIPER   3,335,649
CAMERA SHUTTERS WHICH ALSO ACT AS DIAPHRAGMS
Filed Jan. 29, 1965   3 Sheets-Sheet 3

INVENTOR.
GERD KIPER

United States Patent Office

3,335,649
Patented Aug. 15, 1967

3,335,649
CAMERA SHUTTERS WHICH ALSO ACT AS
DIAPHRAGMS
Gerd Kiper, Unterhaching, Munich, Germany, assignor
to Agfa Aktiengesellschaft, Leverkusen, Germany
Filed Jan. 29, 1965, Ser. No. 428,920
Claims priority, application Germany, Apr. 10, 1964,
A 45,706
8 Claims. (Cl. 95—10)

The present invention relates to cameras.

More particularly, the present invention relates to camera shutters which are capable also of acting as a diaphragm.

In particular, the type of shutter to which the present invention relates includes leading and trailing shutter rings to which the shutter blades are connected, these rings moving together from their rest or run down to their cocked position, and the leading ring moving in advance of the trailing ring from the cocked back to the rest position so as to open the blades to make the exposure whereupon, after a given exposure time, the trailing ring runs down from its cocked to its rest position so as to again close the shutter and terminate the exposure. The particular type of shutter assembly with which the present invention deals has a light-responsive structure which determines the delay in the running down of the trailing ring so as to determine the exposure time. With the particular shutter of the present invention, retarding means provides a continuous retarding force on the leading ring during the running down thereof, and thus the moment when the trailing ring is released by the light-responsive structure for running down movement during the running down movement of the leading ring will determine the size of the aperture, so that in this way the shutter assembly also acts as a diaphragm.

A shutter construction of this general type is disclosed in the copending U.S. patent application Ser. No. 400,539, filed Sept. 30, 1964, now abandoned, and entitled "Camera Shutter Which Also Functions as a Diaphragm."

The light-responsive structure which determines the delay in the running down of the trailing shutter ring includes a relay which becomes energized and de-energized so as to determine the period of the delay, and this delay period provided by the relay must of course be adapted to the actual opening and closing of the shutter blades by the shutter rings.

It is accordingly a primary object of the present invention to provide for a structure of this type an adjusting means which will enable the assembly to be adjusted so as to adapt the delay period provided by the light-responsive structure to the manner in which the blades are actuated by the shutter rings.

In addition, it is an object of the present invention to provide an exceedingly simple adjusting structure which can be used for this purpose.

With these objects in view, the invention includes, in a camera, leading and trailing coaxial shutter rings and a plurality of shutter blades pivotally connected to one of these rings and having pin-and-slot connections to the other of the rings. Both of the rings turn together from their rest to their cocked positions, so that the shutter remains closed at this time inasmuch as there is no relative turning between the rings, and in order to make an exposure the leading ring is first released for running down movement from its cocked to its rest position while the light-responsive delay means cooperates with the trailing ring to maintain the latter in its cocked position during running down of the leading ring, so that in this way there is relative turning between the rings with consequent opening of the shutter blades so as to make the exposure. The light-responsive delay means is electrical and includes a control switch. In addition, a retarding means cooperates with the leading ring to continuously retard the latter during its running down movement. In accordance with the present invention a first adjusting means cooperates with the leading ring for adjusting the rate at which the latter runs down from its cocked to its rest position, and a second adjusting means cooperates with the control switch for controlling the actuation thereof, so that in this way the first and second adjusting means are capable of adjusting the assembly to adapt the operation of the delay means to the operation of the shutter blades.

Figure 2:
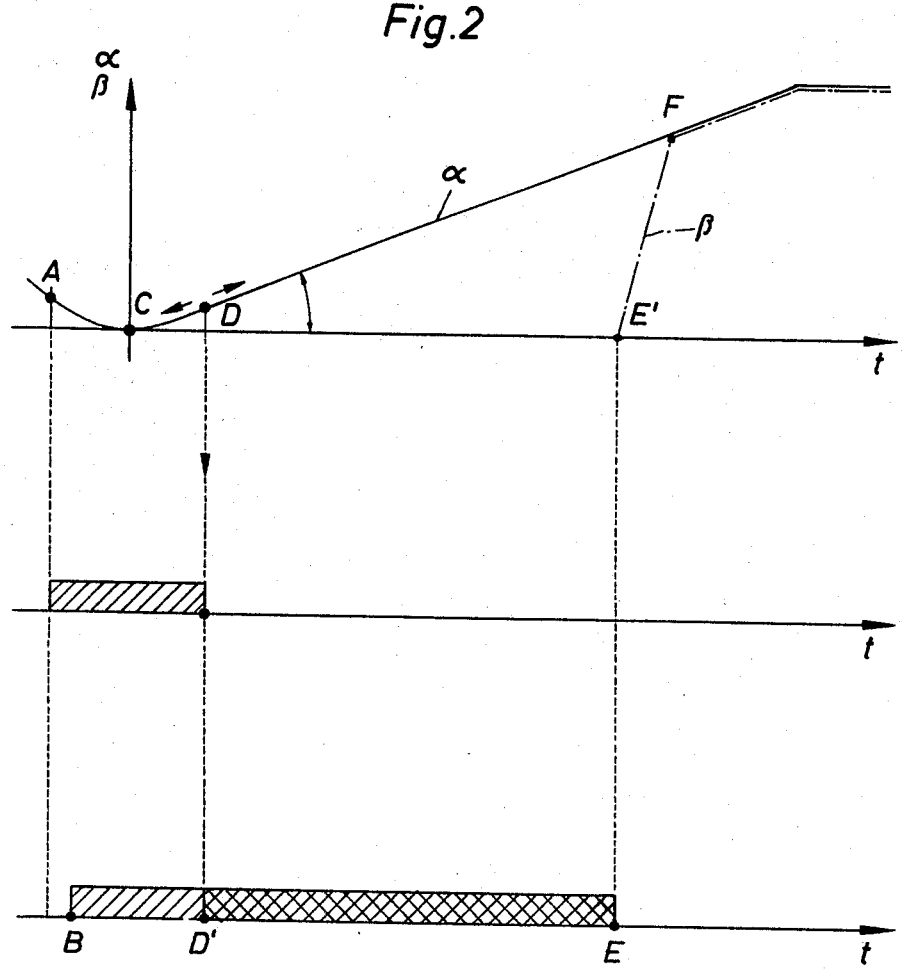
Figure 3:
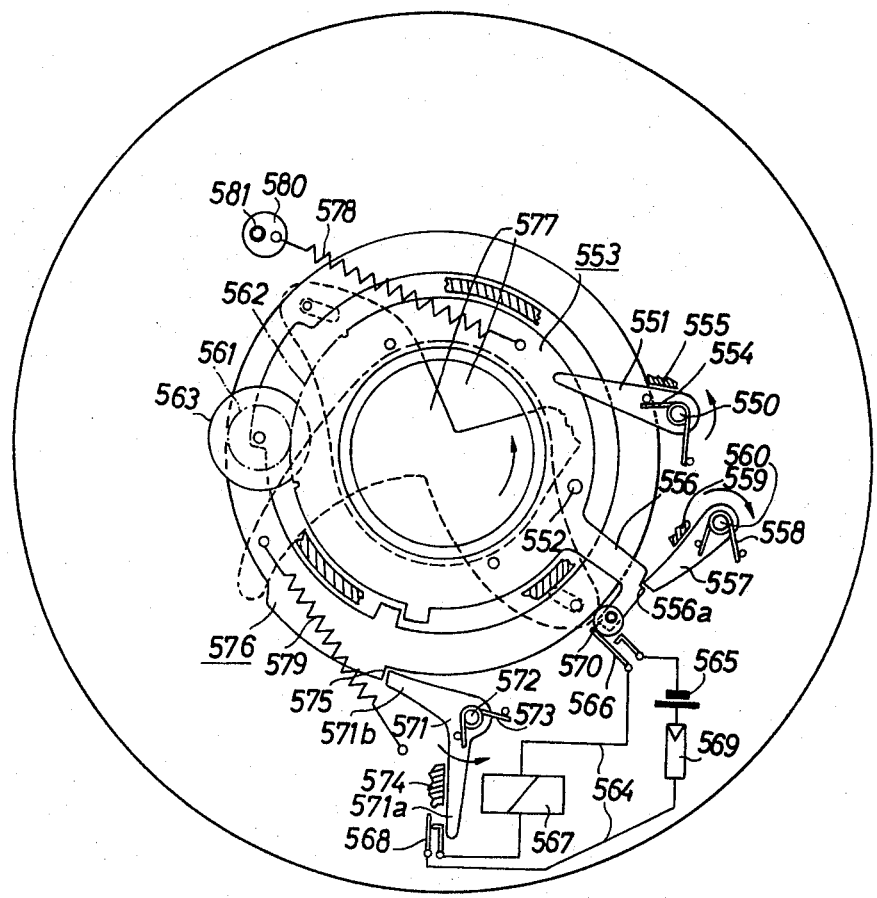

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of one possible embodiment of a structure according to the invention;

FIG. 2 diagrammatically illustrates the manner in which the structure of FIG. 1 operates; and FIG. 3 is an illustration of another possible embodiment of a structure according to the present invention.

Referring now to FIG. 1, the shutter assembly illustrated therein includes a pair of coaxial rotary shutter rings 501 and 502 which are respectively individually mounted for rotary movement about the optical axis. The shutter ring 501 is the leading ring which turns from its cocked to its rest position in advance of the trailing ring 502 in order to open the shutter. This leading ring 501 fixedly carries a pair of pins 504 which are respectively received in slots 505 of a pair of shutter blades 503, so that the shutter blades 503 have pin-and-slot connections, respectively, with the leading ring 501 in the illustrated example. The trailing ring 502 which follows the leading ring in its running down movement so as to close the shutter carries pins 506 by which the blades 503 are pivotally connected, respectively, to the trailing ring 502. Thus, during relative turning of the rings 501 and 502 one with respect to the other the blades will turn relative to each other so as to open or close the shutter, while during turning of the rings 501 and 502 without any relative movement therebetween, the shutter blades will not turn with respect to the rings or with respect to each other. Of course, instead of a pair of shutter blades, it is possible to provide three or more shutter blades.

The leading ring 501 has an inwardly directed projection 507 which engages a stationary stop 508 in order to determine the rest or run-down position of the ring 501. A spring 509 is operatively connected to the ring 501 so as to urge the latter to its rest position where the projection 507 engages the stop 508. A projection 510 of the trailing ring 502 engages the projection 507, and a spring 511 is operatively connected with the trailing ring 502 so as to urge the projection 510 into engagement with the projection 507, and thus in this way the rest or run-down position of the trailing ring 502 is determined.

The leading ring 501 is provided at a portion of its periphery with gear teeth 512. These gear teeth mesh with pinion 513. The pinion is fixed coaxially with an escapement wheel 514, and the assembly of the pinion 513 and the escapement wheel 514 is supported for rotary movement by a shaft 515 which is fixed to a stationary transverse wall of the shutter assembly. An anchor 516 is supported for free pivotal movement on this wall and cooperates with the escapement wheel 514, so that in this way the structure 513–516 forms a retarding means which continuously retards the turning of the leading ring 501 by the spring 509 during the running down of the leading ring 501.

In order to cock and release the shutter, a rotary shaft 517 is capable of being manually turned by an unillustrated transmission which is accessible to an operator, which is operatively connected with this rotary shaft 517, and the shaft 517 fixedly carries a cocking and release lever 518. This lever 518 fixedly carries a pin 519 which supports a swing lever 520 for turning movement on the lever 518, and one end of the lever 520 engages the shaft 517 so as to limit the clockwise turning of the lever 520 relative to the lever 518, as viewed in FIG. 1. A spring 521 is coiled about the pin 519 and has free ends respectively engaging the pin carried by the lever 520 and the pin carried by the lever 518, so that the spring 521 urges the free end of the lever 520 into engagement with the shaft 517. In addition, a spring 522 is connected to the lever 518 so as to urge the latter to turn in a clockwise direction, as viewed in FIG. 1, into engagement with the stationary stop 523 the spring 522 urging the lever 518 to turn in a direction opposite to that indicated by the arrow $a$ in FIG. 1. In order to turn the ring 501 in a direction opposite to that indicated by the arrow $b$ the swing lever 520 engages a pin 524 which is carried by the ring 501, so that in this way during turning of the lever 518 in the direction of the arrow $a$, the lever 520 by engaging the pin 524 will displace the ring 501 to its cocked position, and of course at this time the projection 507 will engage the projection 510 so that the trailing ring 502 will also be displaced to its cocked position.

In order to delay the release of the trailing ring 502 from its cocked position, a light-responsive electrical delay means is provided, and this delay means includes the electrical circuit 525. In this circuit there is connected in series a source of current 526, such as a suitable battery or miniature cell, and also a control switch having the contacts 527a and 527b as well as a capacitor 528 and a photosensitive resistor 529. It is of advantage to arrange the source of current 526 and the capacitor 528 in the interior of the camera, while the photosensitive resistor 529 is arranged at the front side of the camera, where, through a suitable window, for example, the light which impinges on the objective of the camera also impinges on the photosensitive resistor 529. A relay 530 is connected in parallel with the series-connected resistor 529 and capacitor 528. This relay 530 cooperates with a portion 531a of a lever 531, this portion 531a forming an armature which is attracted to the coil of the relay 530 when the latter is energized. The lever 531 is supported for turning movement by a suitable pivot pin carried by the transverse wall of the shutter housing, and this lever 531 has substantially the configuration of a bellcrank. The lever 531 has a second arm 531b which can engage behind projection 532 of the trailing ring 502, so as to hold the ring 502 in its cocked position until the lever 531 returns to the position shown in FIG. 1. For this purpose a spring 533 is connected to the arm 531b of the lever 531, and this spring urges the arm 531b into engagement with a stationary stop 534 in the form of a suitable pin carried by the stationary supporting wall of the shutter assembly.

The switch 527a, 527b includes a movable contact 527b, in the form of an elongated springy member carried by a lever 536 which is supported for turning movement about a pivot 535. With a certain prestress the springy contact leaf 527b engages a lug 537 of the lever 536. A return spring 538 is connected to the lever 536 to urge it to turn in a direction opposite to that indicated by the arrow $c$ into engagement with a stationary stop 539. The stationary contact 527a of the control switch is in the form of a pin eccentrically mounted on a rotary disc 540 which is supported for rotary movement by a support 541 of electrically non-conductive material, and the operator can manually turn the disc 540 to any selected angular position in which it will remain due to the friction of its mounting on the support 541. In this way the distance between the contact 527a and 527b can be adjusted with the adjusting means which includes the disc 540 on which the pin 527a is eccentrically mounted.

In order to actuate the switch contact 527b, which is constantly urged by the return spring 538 to a position in which the control switch is open, the ring 501 is provided with a control projection 542. The lever 536 is situated in the path of turning of the projection 542 so that when the shutter is cocked the projection 542 turns the lever 536 in opposition to the spring 537 away from the stop 539 in the direction of the arrow $c$, and the switch contact 527b engages the switch contact 527a in order to close the control switch just before the lever 520 rides off the pin 524, this lever 520 riding off and beyond the pin 524 when the shutter has reached its cocked position, so that with the shutter of FIG. 1 release of the shutter takes place immediately upon cocking thereof.

In addition to the above-decscribed adjusting means for adjusting the location of the contact 527a, namely the adjusting means provided by disc 540 on which the pin 527a is eccentrically mounted, a second adjusting means is provided for adjusting the tension of the spring 509 which acts on the leading ring 501 to urge the latter back to its rest position. The adjusting means for the spring 509, which is connected at one end to the ring 501, takes the form of a rotary disc 544 which is connected to the other end of the spring 509 and which is supported for turning movement about a pin 543 which is spaced from the center of the disc 544, so that this disc also is an eccentric disc connected to the spring 509 for adjusting the tension thereof. The friction of the mounting in which the disc 544 is turnable is sufficient to maintain the disc 544 in the angular position to which it is turned by the operator, so that in this way the adjusted tension of the spring 509 is maintained.

Thus, by turning the eccentric 544 about the pin 543, the length of the spring 509 in the run-down or rest position of the leading ring 501 can be adjusted, and in this way the tension of the spring 509 can be regulated so as to adjust the force with which the spring 501 is returned to its rest position, and thus the speed of movement of the ring 501 during running down thereof from its cocked to its rest position can be regulated. Of course, the distance between the contact 527b and the contact 527a can be adjusted by the adjusting means 540. Therefore, during the cocking of the ring 501 the lever 536 will be turned so as to place the contact 527b in engagement with the contact 527a at a sooner or later time during the cocking movement of the ring 501 depending upon the distance between the contacts 527a and 527b.

The manner in which the above-described adjustments control the operation of the shutter is illustrated diagrammatically in FIG. 2. The three abscissas shown in FIG. 2 are each graduated according to elapsed time. The uppermost abscissa cooperates with an ordinate which is graduated in accordance with the angles of turning $\alpha$ and $\beta$ of the rings 501 and 502, respectively. The shaded field provided over the middle abscissa of FIG. 2 represents the duration of time during which the switch 527a, 527b is closed, while the shaded field over the lowermost abscissa of FIG. 2 indicates the time during which the relay 530 is energized.

Assuming now that the parts are in the position of FIG. 1 and that the shaft 517 is turned in order to cock the shutter, then of course the lever 518 will turn in the direction of the arrow $a$, so that after a relatively short amount of turning movement the lever 520 will engage the pin 524 so as to turn the rings 501 and 502 in a direction opposite to that indicated by the arrow $b$. Because of the engagement of the projections 507 and 510 both of the shutter rings will turn together. Inasmuch as at this time the shutter rings do not turn relative to each other, the blades 503 remain in their closed positions, respectively. Shortly before the end of the cocking movement, the projection 542 of the ring 501 engages the lever 536 and turns it in the direction of the arrow c. After a relatively short amount of turning of the lever 536, the contact 527b will engage the contact 527a, so that the control switch of the circuit 525 is now closed. The instant when the control switch closes, is indicated at the point A in the diagram of FIG. 2. At this instant, the circuit 525 closes and current flows therethrough. After a relatively short delay the relay 530 becomes energized and the instant when the relay becomes energized is indicated at the point B indicated at the lowermost abscissa of FIG. 2. As a result of the energizing of the relay 530 the lever 531 is turned in the direction of the arrow d, and the lever arm 531b engages behind the projection 532 of the trailing ring 502 so as to prevent the latter from running down in the direction of the arrow b.

After a relatively short further turning of the leading ring 501 in a direction opposite to that indicated by the arrow b, the swing lever 520 rides off the pin 524. Now, the spring 509 can return the ring 501 to its rest position in the direction of the arrow b, while the trailing ring 502 is held by the lever 531. The moment when the lever 520 moves beyond the pin 524 is indicated at C in the diagram of FIG. 2. In accordance with the tension of the spring 509, the leading ring 501 will be delayed to a greater or lesser extent during its running down movement, and the rate at which the ring 501 returns to its rest position is indicated by the curve α in FIG. 2. If, as a result of an increase in the tension of the spring 509, or as a result of a decrease in the retarding force provided by the retarding means 513–516, ring 501 runs down at a faster rate, then of course, the curve α will be steeper than illustrated in FIG. 2.

Shortly after the beginning of the running down movement of the leading ring 501 in the direction of the arrow b, the lever 536 can be returned by the spring 538 to its initial position. As a result, the control switch 527a, 527b is again opened. The moment when the control switch 527a, 527b is opened is indicated at the point D in FIG. 2. As a result of the inclusion of the photosensitive resistor 529 in the electrical delay circuit, the deenergizing of the relay 530 is delayed. The extent to which the deenergizing of relay 530 is delayed depends upon the magnitude of the resistance of the photosensitive resistor 529, and thus upon the brightness of the particular subject which is to be photographed. With a given light intensity there will, for example, be a delay which is indicated in FIG. 2 at the area between the points D' and E. From FIG. 2 it is apparent that by shifting the point D along the curve α in one or the other direction, as indicated by the arrows, there will also be a shifting of the point E, inasmuch as the distance between the points D' and E is determined exclusively by the intensity of the light which impinges on the photosensitive resistor 529.

At the point E the relay 530 is deenergized, so that the holding pawl 531 returns to its rest position under the influence of the spring 533, thus releasing the trailing ring 502, as indicated at the point E' in FIG. 2. The trailing ring 502 now runs down without any retarding thereof, as indicated by the dot-dash line curve β in FIG. 2. At the moment F shown at the upper right of FIG. 2, the stop projection 510 of the trailing ring engages the stop projection 507 of the leading ring, so that from this point on both of the rings return, without any relative movement therebetween, to their rest or run-down position while delayed by the retarding force of the retarding means 513–516. Thus, the shutter is closed approximately at the point F.

By adjusting the moment when the control switch 527a, 527b opens and by adjusting the steepness of the curve α, which represents the running down movement of the shutter ring 501, it is possible to provide a faultless correlation between the electrical delay action provided by the delay circuit 525 and the elements of the shutter itself.

The shutter structure which is illustrated in FIG. 3 corresponds in its essential aspects with that of FIG. 1 With the shutter of FIG. 3, however, it is possible to hold the shutter in its cocked position. Thus, this shutter includes a rotary shaft 550 which is capable of being manually turned by any suitable unillustrated structure which may be operated in connection with transportation of the next unexposed film frame into a position to be exposed. The shaft 550 fixedly carries a cocking lever 551 which, during cocking of the shutter, engages the pin 552 which is carried by the leading ring 553 of the shutter of FIG. 3. The shaft 550 as well as the lever 551 are urged to their rest position engaging a stop 555 by a spring 554.

The leading ring 553 is provided with a projection 556 formed with a notch 556a for receiving a holding pawl 557. This holding pawl 557, which is urged by a spring 558 into engagement with a stationary stop 559, is fixed to a rotary release shaft 560 which is connected through an unillustrated structure to a shutter release member which is accessible to the operator so that the operator can manually turn the shaft 560 in order to release the shutter for running down movement.

With this embodiment the retarding means which acts on the leading ring 553 is in the form of a rotary mass which provides the retarding force as the result of the inertia of this mass. For this purpose, a pinion 561 meshes with teeth 562 formed at the exterior periphery of the ring 553, and this pinion 561 is fixed coaxially with the retarding mass 563 and is supported with the latter for rotary movement about a stationary shaft. Of course, instead of such a retarding structure it is possible to use other known retarding structures such as, for example, a pneumatic retarding structure.

The electrical delay means of the embodiment of FIG. 3 includes an electrical circuit 564 in which there are connected, in series, a source of current 565, a control switch 566, a relay 567, a further control switch 568, and a photosensitive resistor 569. The control switch 566, which is a normally closed switch, is capable of being opened by a disc 570 which is eccentrically mounted for turning movement on a free end of the portion 556 of the leading ring 553. Thus, by turning the disc 570, it is possible to control the distance between the contacts of the normally closed switch 566, and thus the disc 570 forms an adjusting means which corresponds to the switch-adjusting means of FIG. 1 as will be apparent from the description below. The switch 568, on the other hand, is a normally open switch, and this switch is capable of being maintained in a closed position by an arm 571a of a holding pawl 571. This holding pawl 571 is supported for pivotal movement about a stationary pin 572 and is acted upon by a spring 573 which urges the arm 571a against a stationary stop member 574, and of course when the arm 571a engages the stop 574 the switch 568 is closed. The other arm 571b of the holding pawl 571 extends, in its rest position, in the path of the running down movement of a stop shoulder 575 of the trailing shutter ring 576. A pair of shutter blades 577 are connected with the rings 553 and 576 in the same way that the blades of FIG. 1 are connected to the rings of FIG. 1. Furthermore, drive springs 578 and 579 are respectively connected operatively to the shutter rings 553 and 576 for urging them to their run-down or rest positions. The spring 578 is thus connected at one end directly to the shutter ring 553, while the other end of this spring is connected to the eccentric disc 580 which is turnable about a pin 581 which is spaced from the center of the disc 580, and here again the friction of the turnable mounting of the disc 580 is sufficient to maintain the latter in the angular position to which it is turned by the operator, so that through this adjusting means it is possible to regulate the tension of the spring 578 and thus the speed with which the leading ring 553 runs down.

Therefore, with the embodiment of FIG. 3 also there are a pair of adjusting means, namely the adjusting means provided by the eccentric disc 570 which controls the distance between the contacts of the switch 566 and the adjusting means provided by the disc 580 which adjusts the tension of the ring 578. The adjustment of the switch 566 will control the moment when this switch closes when the leading ring 553 is released for running down movement by the spring 578.

With the embodiment of FIG. 3, when it is desired to make an exposure, the operator will turn the shaft 550 and the lever 551 in a counterclockwise direction, as viewed in FIG. 3, and the result is that the cocking lever 551 engages the pin 552 in order to turn the leading ring 553 and the trailing ring 576 simultaneously in a clockwise direction, and since there is no relative turning between these rings the shutter blades 577 remain closed. The cocking continues until the holding pawl 557 engages the notch 556a and of course at this time the holding pawl 571 also engages, with its arm 571b the shoulder 575 of the trailing ring 576. The parts are now in the cocked position illustrated in FIG. 3, and they will remain in this position until the operator actuates the shaft 560 so as to release the shutter. When the shaft 560 is turned in opposition to the spring 558 in a counterclockwise direction, the pawl 557 will also turn with the shaft 558, so as to move away from the notch 556a, and now the leading ring 553 will be released to the spring 578 which will drive the leading ring 553 back to its rest position, the turning of the leading ring 553 being continuously retarded by the retarding means 561, 563. After an initial relatively short movement from its cocked position, the ring 553 will have displaced the eccentric 570 beyond the movable contact of the switch 566, and this movable contact now engages the stationary contact of the switch 566 so that the circuit 564 becomes closed. However, the relay 567 does not become energized immediately upon closing of the switch 566. The energizing of the relay 566 is delayed as a result of the presence of the photosensitive resistor 569, and the extent of delay in the energizing of the relay 567 will be determined by the intensity of the light which impinges on the resistor 569. Therefore, this delay period, which is determined by the light intensity, will determine when the relay 567 becomes energized to an extent sufficient to turn the holding pawl 571 in opposition to the spring 573 in a counterclockwise direction, as viewed in FIG. 3, away from the stop 574, so as to displace the arm 571b away from the shoulder 575 and thus release the trailing ring 576 for running down movement by the spring 579. Immediately upon energization of the pawl 567 to turn the lever 571 away from the stop 574, the switch 568 automatically opens so as to open the circuit and thus the spring 573 will again seek to return the lever 571 to the position shown in FIG. 3 so that the arm 571b will engage the outer periphery of the ring 576 in preparation for stepping behind the shoulder 575 when the shutter is again cocked.

It is thus apparent that in this embodiment also the pair of adjusting means 570 and 580 are capable of being adjusted so as to control the moment when the switch 566 closes to initiate the delay period during which the energizing of the relay 567 is delayed, and determined by the light impinging on the photosensitive resistor 569, and at the same time, the spring 578 can be adjusted so as to control the speed with which the leading ring 553 runs down, so that with the embodiment of FIG. 3 it is possible to achieve the same adjustment as that illustrated in FIG. 2, thus providing a perfect correlation between the energizing and the deenergizing of the relay 567 and the operation of the shutter blades 577.

Of course, variations in the above-described structure are possible. Thus, instead of increasing or decreasing the force of the spring which returns the leading ring to its rest position, it is possible to decrease or increase, respectively, the retarding provided by the retarding means which acts on the leading ring, and structures for adjusting a retarding means in this way are of course well known. Moreover, different electrical delay circuits can be provided so as to provide the electrical delay which will determine the exposure time as well as the aperture with the shutter of the invention.

It will be understood that each of the elements described above, or two or more together, may also find a useful application in other types of shutters differing from the type described above.

While the invention has been illustrated and described as embodied in shutters which also act as diaphragms, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position; and second adjusting means cooperating with said control switch for controlling the moment of actuation thereof.

2. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position, said first adjusting means being operatively connected to the spring means which acts on said leading ring for urging the latter to said rest position thereof; and second adjusting means cooperating with said control switch for controlling the moment of actuation thereof.

3. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position, said first adjusting means being operatively connected to the spring means which acts on said leading ring for urging the latter to said rest position thereof and said first adjusting means being in the form of a rotary eccentric member connected to an end of said spring means which is connected with said leading ring for adjusting the tension of said latter spring means; and second adjusting means cooperating with said control switch for controlling the moment of actuation thereof.

4. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position; and second adjusting means cooperating with said control switch for controlling the moment of actuation thereof, said control switch having a pair of contacts and said second adjusting means being operatively connected to at least one of said contacts for adjusting the distance between said pair of contacts so as to control the actuation of said control switch.

5. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position; and second adjusting means cooperating with said control switch for controlling the moment of actuation thereof, said control switch having a pair of contacts and said second adjusting means being operatively connected to at least one of said contacts for adjusting the distance between said pair of contacts so as to control the actuation of said control switch, said one contact which is adjusted by said second adjusting means being in the form of a pin and said second adjusting means taking the form of an eccentric member carrying said pin and being turnable for adjusting the location of said pin with respect to the other of the contacts.

6. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position; and second adjusting means cooperating with said control switch for controlling the moment of actuation thereof, said control switch having at least one contact which is located in the path of movement of a portion of said leading ring and said adjusting means being carried by said portion of said leading ring and engaging said one contact.

7. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position; and second adjusting means cooperating with said control switch for controlling the moment of actuation thereof, said control switch having at least one contact which is located in the path of movement of a portion of said leading ring and said adjusting means being carried by said portion of said leading ring and engaging said one contact, said second adjusting means being in the form of a rotary eccentric member carried by said portion of said leading ring and engaging said contact of said control switch for controlling the actuation of the latter.

8. In a camera, in combination, coaxial leading and trailing rotary shutter rings and a plurality of shutter blades each pivotally connected to one of said rings and each having a pin-and-slot connection with the other of said rings, said rings turning together from a rest to a cocked position and said leading ring running down from its cocked to its rest position in advance of said trailing ring for displacing said blades to an open position and said trailing ring then running down from its cocked to its rest position to return said blades to a closed position; a pair of spring means operatively connected to said rings for urging the latter from said cocked to said rest positions thereof; retarding means operatively connected to said leading ring for retarding the running down movement thereof; electrical delay means responsive to the lighting conditions and operatively connected to said trailing ring for delaying the running down thereof for a time determined by the lighting conditions, said delay means including a control switch; first adjusting means operatively connected to said leading ring for adjusting the rate at which the latter runs down from its cocked to its rest position; and second adjusting means cooperating with said control switch for controlling the moment of actuation thereof, said control switch having at least one contact which is located in the path of movement of a portion of said leading ring and said adjusting means being carried by said portion of said leading ring and engaging said one contact, said second adjusting means being in the form of a rotary eccentric member carried by said portion of said leading ring and engaging said contact of said control switch for controlling the actuation of the latter, said eccentric of said second adjusting means engaging said contact of said control switch when said leading ring is in the cocked position thereof.

References Cited
UNITED STATES PATENTS

| | | | |
|---|---|---|---|
| 2,578,604 | 12/1951 | Santoni | 95—63 |
| 2,890,640 | 6/1959 | Noack | 95—63 |
| 3,164,077 | 1/1965 | Mulats | 95—63 |

NORTON ANSHER, *Primary Examiner.*

J. F. PETERS, *Assistant Examiner.*